Jan. 27, 1942.  W. E. HIRTENSTEINER  2,270,878
RIB STITCHING CLIP
Filed Feb. 6, 1940

Inventor
WALTER E. HIRTENSTEINER,
By
Attorney

Patented Jan. 27, 1942

2,270,878

UNITED STATES PATENT OFFICE 2,270,878

RIB STITCHING CLIP

Walter E. Hirtensteiner, Inglewood, Calif., assignor to Interstate Aircraft and Engineering Corp., a corporation of California Application February 6, 1940, Serial No. 317,547

2 Claims. (Cl. 244—132)

This invention relates generally to means for securing fabric to a supporting member and more particularly relates to airplane wing construction embodying a fabric covering.

In airplane construction embodying fabric covered structures, the fabric is ordinarily secured to the supporting framework by means of thread or twine, or in some instances tacked. For example, in attaching the fabric to the wing by twine it is the usual practice to run the twine from the top of the wing, down through the wing on one side of a rib and out through the lower surface and then back up through the wing on the other side of the rib to the top. A long needle is employed to accomplish this. The twine is knotted above the fabric surface to prevent the twine from pulling out. This method of securing the wing fabric is disadvantageous in that it is an exceedingly slow operation requiring two workmen, one above and one below the wing, and consequently is an expensive method of production. Another disadvantage is the fact that a series of knots are left above the wing fabric which must be covered by tape and even when so covered, provide an irregular surface transversely of the wing in the region of each of the wing ribs. Still another disadvantage of the use of twine or thread in fastening the wing fabric to the framework of the wing is the fact that the twine is subject to rotting and also in danger of being severed through vibration of the wing and rubbing of the twine against parts of the framework of the wing.

In view of the disadvantages of the ordinary method of attaching the fabric to airplane wings, it is a primary object of this invention to provide a new and improved means of fastening fabric to the framework of the wing or to the framework of other structures which does not entail the above disadvantages of the ordinary method. It is a particular object of this invention to provide a fastening means of the type indicated which is inexpensive and which may be quickly installed by a single workman in the fastening of fabric to a fabric supporting member. It is also an object of this invention to provide a fastening means of a durable nature.

In order to carry out the above objects, it is an object of this invention to provide a securing means in the form of a wire clip which is adapted to engage the outer surface of the fabric to be secured and is further adapted to clip into holes in the member to which the fabric is to be secured.

It is also an object of this invention to provide a fastening means which when placed under load has a tendency to more firmly be secured in the member to which it is attached.

It is also an object of this invention to provide an airplane wing construction embodying the securing means of this invention which makes possible the securing of the fabric to the ribs of the wing framework without causing projections above the main surface of the wing, thereby allowing the use of a covering tape which will lay flat and give the wing a smooth surface free from bulges or bumps normally present on the wing when the fabric is secured by the ordinary method.

These and other objects will be apparent from the drawing and description thereof. Referring to the drawing which is for illustrative purposes only:

Figure 1:
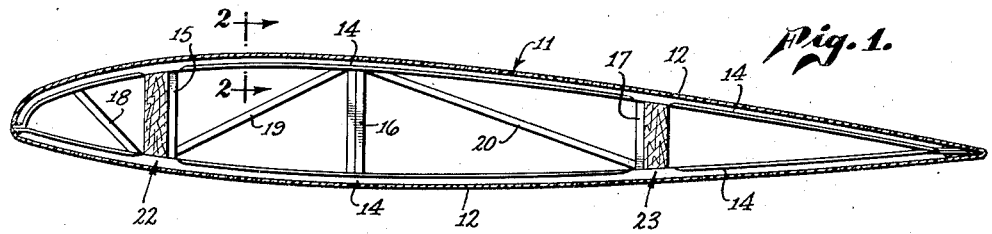
Fig. 1 is a sectional elevation of a wing embodying the invention.

More particularly describing the invention, in Fig. 1 there is shown a cross section of a wing including a rib 11 and the fabric covering of the wing 12. The rib includes upper and lower rib cap members 14 secured together at their ends by any suitable means. The cap members are braced by the vertical members 15, 16 and 17 and by the angularly disposed members 18, 19 and 20. The ribs of the wing are attached to the front and rear spars 22 and 23 respectively which extend through the ribs longitudinally of the wing.

Figure 2:
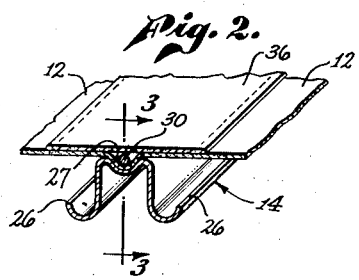
Fig. 2 is a sectional perspective view on line 2—2 of Fig. 1 showing the various parts of the invention.

As shown in Fig. 2, the rib cap members 14 are preferably formed of metal in the shape of a channel having turned up edge portions 26. The base of the channel is formed to provide a longitudinal depression 27 along the entire length of the outside of the rib cap member. This depression is provided at intervals with pairs of spaced holes 28 which are adapted to receive the prongs or end portions of the clip member of the invention indicated by reference numeral 30.

The clip member or fastener comprises a wire bent to form an elongated main portion or fabric engaging portion 31 terminating in an end portion 32 which is bent back upon the main portion to form a hooked end portion. The other end of the main portion of the clip terminates in an extended portion 33 which is also bent back upon the main portion to form a hook and is further bent, in a reverse direction to form a flared or outwardly disposed end portion 34 on the hook.

Figure 5:
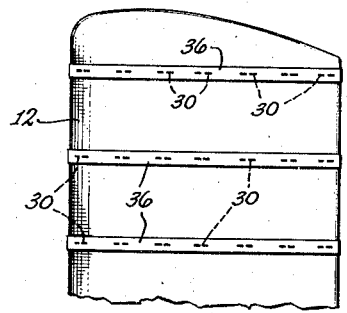
Fig. 5 is a fragmentary top plan view of a completed wing.

In securing the wing fabric 12 to the rib cap members 14 the fabric is first stretched over the wing framework and the clips 30 are forced through the fabric into the holes 28 of the ribs. Inasmuch as the wing fabric is not doped prior to the securing operation, it is an easy matter to locate the pairs of holes 28 in the rib cap members 14 from a point exterior of the wing. In this connection, the rib cap members may be provided with any suitable number of pairs of holes 28 to accommodate the desired number of clips 30 spaced along each rib cap member at the desired intervals. The clip members are shown spaced along each rib member in broken lines in Fig. 5.

Figure 3:
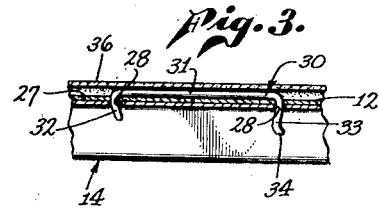
Fig. 3 is a sectional elevation on line 3—3 of Fig. 2 showing the securing means of the invention.
Figure 4:
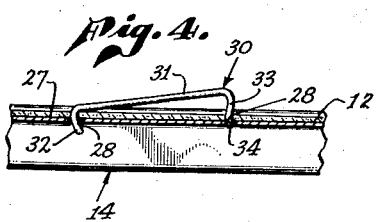
Fig. 4 is a view similar to Fig. 3 with the cover tape removed and showing the clip being inserted.

In the operation of mounting the clip in the rib cap, the end portion 32 is first inserted through the wing fabric and into one of the spaced holes 28 as shown in Fig. 4 of the invention. When this has been done, the other end of the clip may be brought to the position shown in Fig. 4 where the outer flared end portion 34 of the clip engages the other of the holes 28. By pressing down on the clip, the clip may be sprung through the hole to the position in which it is shown in Fig. 3.

After the clips have been secured in the proper holes in the rib caps in the form of the invention shown in Fig. 2, the main portion of each clip is contained within the depression 27 of the rib cap. Since no part of the clip extends beyond the rib cap a wing embodying the construction described above does not have the objectionable uneven or bumpy surface characteristics of wings having the ordinary types of fabric fastening means. The clips are covered by finishing strips 36 (see Figs. 2 and 5) which are securely "doped" into place. Due to the fact that the clips do not extend beyond the rib caps as above pointed out, the outer surface of the finishing strips is smooth and uninterrupted by bumps.

Figure 6:
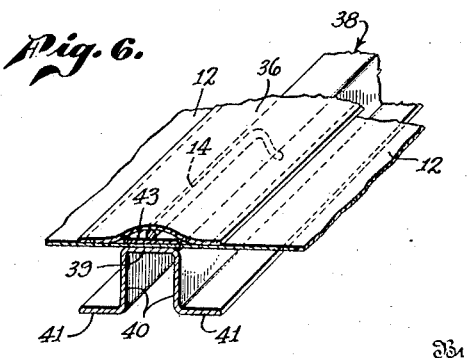
Fig. 6 is a sectional perspective view similar to Fig. 2 showing another form of rib cap strip.

In Fig. 6 there is shown another form of rib cap member indicated by reference numeral 38 which comprises a flat base portion 39, side portions 40 and end portions 41 which extend outwardly from the side portions and substantially parallel to the base portion 29. The portion 39 is provided with spaced apertures to accommodate the clip members in the same manner as the rib cap members 14.

In some instances it may be desirable to provide a reinforcement tape between the wing fabric and the main body of the clip member. Such a tape is shown in Fig. 6 and is indicated by reference numeral 43. A reinforcement tape may also be used in the construction shown in Figs. 2 and 3 if desired.

Although the clip member 30 has been shown and described particularly in connection with a rib cap of thin walled metal having openings therethrough to receive the ends of the clip, it is contemplated that other types of rib cap members might be used which could be provided with suitable recesses or holes for the ends of the clip member. Preferably where metal rib caps are employed, the metal clip members are made of a suitable metal which is corrosive proof and which will not set up electrolytic action with the metal of the rib cap member.

Although the invention has been shown and described with particular reference to airplane wing construction, the invention is suitable for use in various cases where fastening means is needed, particularly for securing airfoil surfaces to ribs or other frame structure. It is contemplated that changes might be made without departing from the scope of the invention and it is intended to cover such changes as come within the scope of the claims.

I claim as my invention:

1. In airfoil construction for airplanes; the combination of a frame member having spaced holes therein, a surface fabric, and a wire clip comprising a wire bent to form an elongated central fabric engaging portion having downwardly and slightly inwardly curved end portions adapted to extend through the holes in the frame member, one of said end portions terminating in an outwardly flared portion whereby the clip may be sprung into position to hold the fabric against the frame member.

2. In airfoil construction for airplanes; the combination of a frame member having spaced holes therein, a surface fabric, and an elongated resilient fastening member having a central fabric engaging portion terminating in end portions bent toward each other forming a hook at each end adapted to extend through the holes in the frame member, one of said end portions terminating in an outwardly flared portion whereby the fastening member may be sprung into position to hold the fabric against the frame member.

WALTER E. HIRTENSTEINER.